United States Patent [19]

Allen

[11] Patent Number: 5,226,731
[45] Date of Patent: Jul. 13, 1993

[54] APPARATUS FOR MEASURING ROTOR EXHAUST GAS BULK TEMPERATURE IN A COMBUSTION TURBINE AND METHOD THEREFOR

[75] Inventor: James M. Allen, Cupertino, Calif.

[73] Assignee: Electric Power Research Institute, Palo Alto, Calif.

[21] Appl. No.: 890,537

[22] Filed: May 28, 1992

[51] Int. Cl.⁵ .......................... G01J 5/08; G01K 1/14; G01K 13/02
[52] U.S. Cl. .................... 374/124; 374/144; 374/128; 356/43
[58] Field of Search ............... 374/124, 128, 137, 144; 356/43, 44; 60/39.281, 39.27, 39.29

[56] References Cited

U.S. PATENT DOCUMENTS

| | | | |
|---|---|---|---|
| 3,623,368 | 11/1971 | Decker, Jr. | 374/144 |
| 3,696,678 | 10/1972 | Mossey | 374/125 |
| 3,855,864 | 12/1974 | Douglas | 374/144 |
| 4,227,369 | 10/1980 | Williams | 374/144 |
| 4,279,153 | 7/1981 | Kervistin et al. | 374/144 |
| 4,326,798 | 4/1982 | Kahn | 374/144 |
| 4,505,150 | 3/1985 | Seymour et al. | 374/144 |
| 4,648,711 | 3/1987 | Zachary | 356/43 |
| 4,797,006 | 1/1989 | Masom | 356/43 |
| 4,970,670 | 11/1990 | Twerdochlib | 374/163 |

FOREIGN PATENT DOCUMENTS

| | | | |
|---|---|---|---|
| 2250142 | 4/1974 | Fed. Rep. of Germany | 374/144 |
| 2277235 | 1/1976 | France | 374/144 |
| 2130717 | 6/1984 | United Kingdom | 374/144 |
| 2133877 | 8/1984 | United Kingdom | 374/144 |

OTHER PUBLICATIONS

"Infrared Thermometry for Control and Monitoring of Industrial Gas Turbines", by P. J. Kirby, R. E. Zachary, and F. Ruiz, presented at the Internat'l. Gas Turbine Conf. & Exhib. Dusseldorf, W. Ger. Jun. 8–12, 1986.
"Blade Temperature Measurements of Model V84.2 100MW/60 Hz Gas Turbine", by T. Schulenberg and H. Bals, presented at the Gas Turbine Conf. & Exhib. Anaheim, Calif. May 31–Jun. 4, 1987.
Land Pyrometers Limited paper by T. G. R. Beynon, entitled "Infra-red Radiation Thermometry Applied to the Development and Control of Gas Turbines".
Schreiber, H. "Optical Pyrometer Measurement of Utility Gas Turbine Blade Metal Temperature", EPRI Technical Brief, TB.APS. 33.7.88, RP2102,2985.
EPRI AP-6020, Project 2101-3, Final Report, entitled "Using Optical Pyrometry to Measure Gas Turbine/Blade Metal Temperatures", (Dec. 1988).

*Primary Examiner*—William A. Cuchlinski, Jr.
*Assistant Examiner*—Diego F. F. Gutierrez
*Attorney, Agent, or Firm*—Flehr, Hohbach, Test, Albritton & Herbert

[57] ABSTRACT

The rotor exhaust gas bulk total temperature relative to the last blade row of a combustion turbine is determined by traversing an optical pyrometer radially across the last stage blades. The resulting radial temperature measurements are then flow weight averaged to provide an accurate bulk gas temperature relative to the last row of blades. Such temperature is useful in a feedback control system for the turbine. A technique of traversing is to cause the optical pyrometer to traverse by mounting its line of sight or optical axis at an angle to its axis of rotation.

2 Claims, 3 Drawing Sheets

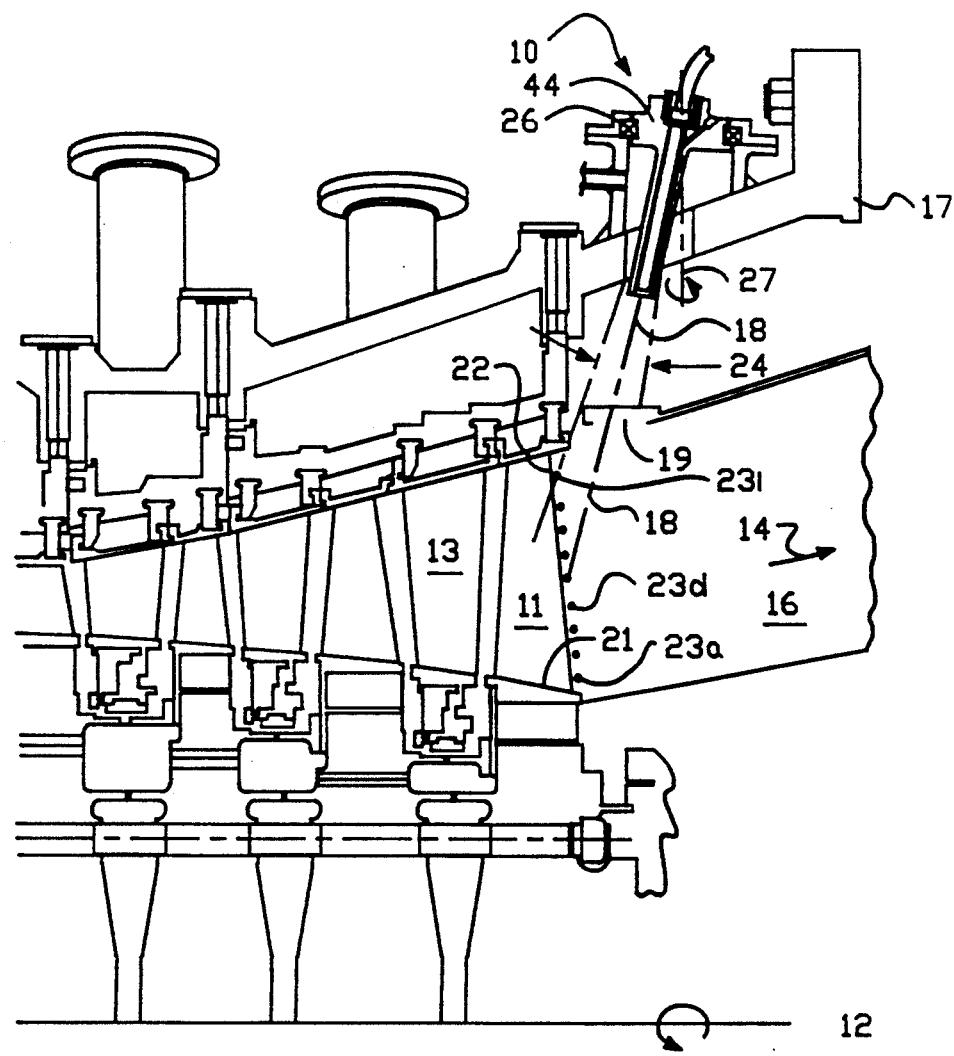
FIG.—1
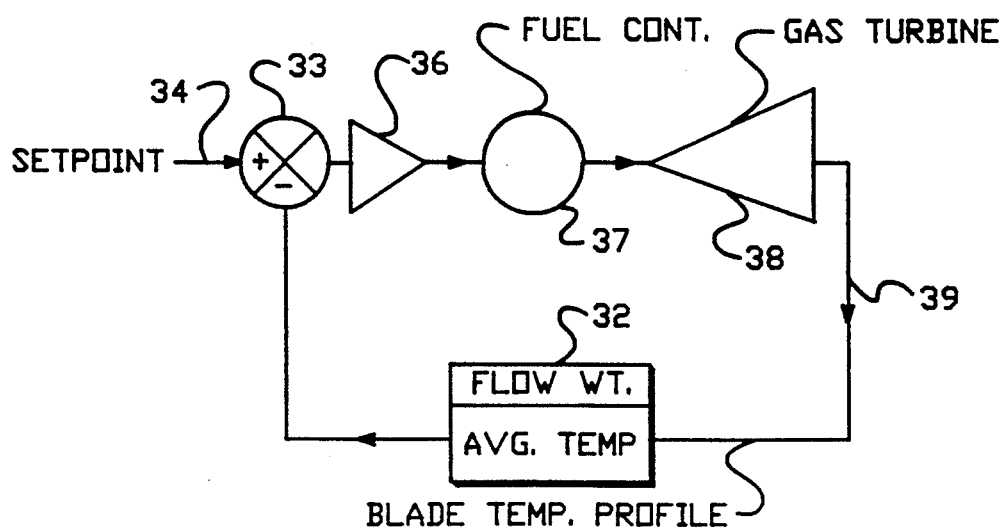
FIG.—2

APPARATUS FOR MEASURING ROTOR EXHAUST GAS BULK TEMPERATURE IN A COMBUSTION TURBINE AND METHOD THEREFOR

The present invention relates generally to apparatus for measuring rotor exhaust gas bulk total temperature relative to the last blade row in a combustion turbine and method therefor and more specifically to accurately measuring said exhaust gas by measuring the temperature of a plurality of radial points along the last stage rotating turbine blades.

BACKGROUND OF THE INVENTION

Combustion turbines are used both in an industrial capacity for generation of power, as a prime mover in certain applications such as locomotives, and in jet aircraft engines. At the present time, the control of the output of industrial/electric utility gas turbines is accomplished by measuring the turbine exhaust total temperature relative to the exhaust duct; and specifically this is done by, for example, thermocouples in the exhaust gas duct. Ideally the firing temperature in the combustion chamber should be directly measured but this is not possible because of the harsh conditions within the chamber. Thus, the firing temperature has to be inferred by using the thermocouples placed inside the exhaust duct outlet of the turbine.

A number of problems are associated with the above prior technique. For example, gases exiting the turbine are not always uniform in temperature at exhaust gas measuring points and therefore any derived average temperature is inaccurate.

Infrared thermometry has also been successfully employed in industrial gas turbines to monitor metal temperatures of the first turbine blade. This is then combined with the exhaust thermocouple average to provide some kind of measurement of gas bulk temperature. But still this method is not accurate especially since the first stage temperatures are quite variable due to blade cooling, and variation in coolant flow bypassing the first stage for cooling later rows, etc.

OBJECT AND SUMMARY OF INVENTION

It is a general object of the present invention to provide an improved apparatus and method therefor for accurately measuring rotor bulk exhaust temperature of a combustion turbine from which firing temperature can be more accurately inferred.

In accordance with the above object there is provided apparatus for measuring rotor exhaust gas bulk total temperature in a combustion turbine which includes first and last stages of rotating turbine blades comprising optical pyrometer means for measuring the temperature of the last stage turbine blades at a plurality of radial points from the turbine hub to tip and means for calculating the exhaust bulk total temperature relative to the last blade row by flow weight averaging the measured points.

BRIEF DESCRIPTION OF THE DRAWING

FIG. 1 is a fragmentary cross-sectional view of apparatus embodying the present invention.

FIG. 2 is a block diagram of the closed loop control system incorporating the present invention.

DETAILED DESCRIPTION OF PREFERRED EMBODIMENTS

Figure 3:
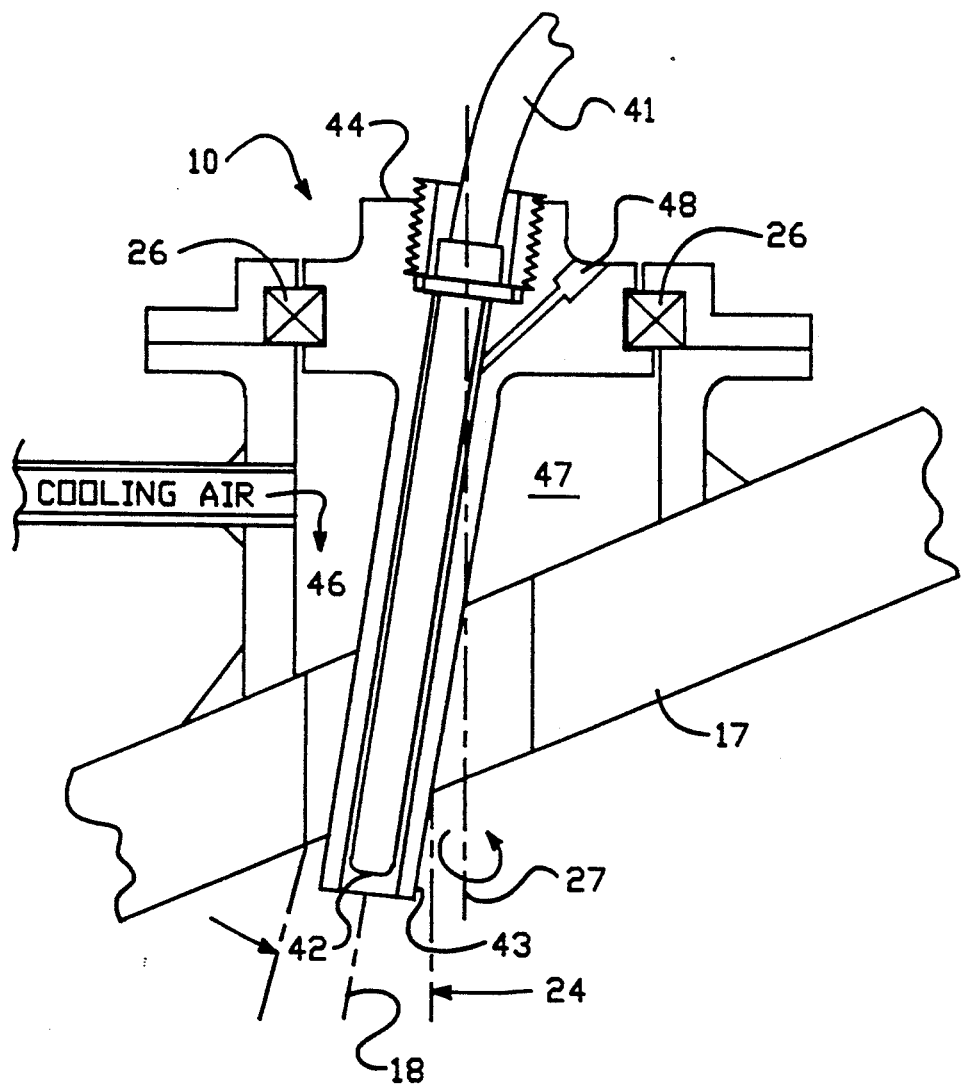
FIG. 3 is an enlarged cross-sectional view of a portion of FIG. 1.
Figure 4:
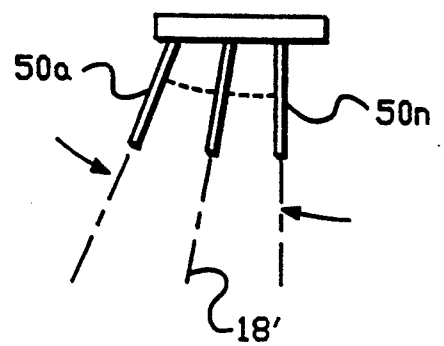
FIG. 4 is a simplified cross-sectional view of an alternative embodiment of FIG. 3.

FIG. 1 shows a turbine section assembly embodying the optical pyrometer 10 of the present invention. The last stage rotor blades are shown at 11 (only one of which is of course visible, the others being radially located around the axis 12). The hot combustion gas passes through a series of multivane stator segments, the last one being indicated at 13 and is exhausted as shown by the arrow 14 through the exhaust duct 16.

The scanning optical pyrometer 10 is mounted on the outer exhaust casing wall 17 and has a line of sight indicated at 18 which extends through the aperture 19 of the exhaust duct 16. This line of sight traverses radially across the last stage turbine blades (they are of course rotating at the time) over a plurality (for example 5) of points 23a–23i from the turbine blades hub (inner diameter) 21 to its tip (outer diameter) 22. The points are indicated roughly as points 23. Thus, as shown by the angle 24, the line of sight 18 is moved over this range of traverse.

And to provide this range of traverse the optical pyrometer 10 in its holder 44 is supported by bearing 26 which has an axis of rotation 27 with the line of sight 18 of the pyrometer 10 being located at an angle to this axis of rotation. (This is better shown in FIG. 3 and discussed in detail there). In general, an oscillatory motion of the bearing 26 causes the optical pyrometer to move over its range of motion 24 and by control techniques (not shown) the location of the specific radial point of the metal turbine blade is determined as far as its location along the radial line to thus provide the metal temperature at that point.

It is also apparent from examination of FIG. 1 that the viewing angle of the last stage turbine blades 11 is steep enough so that the turbine vane 13 is not viewed. This of course would involve a significantly different and erroneous temperature. Thus the viewing angle shows that only the suction side of the last stage rotating blades is looked at. As stated above, during operation, the angular motion of the holder of the pyrometer is recorded along with the temperature and this is coupled as a blade temperature profile, into a control unit 31 as illustrated in FIG. 2. The temperatures from the blade profile are flow weight averaged so that a temperature accurately representing the rotor bulk exhaust total temperature relative to the last stage or blade row is produced.

Figure 5:
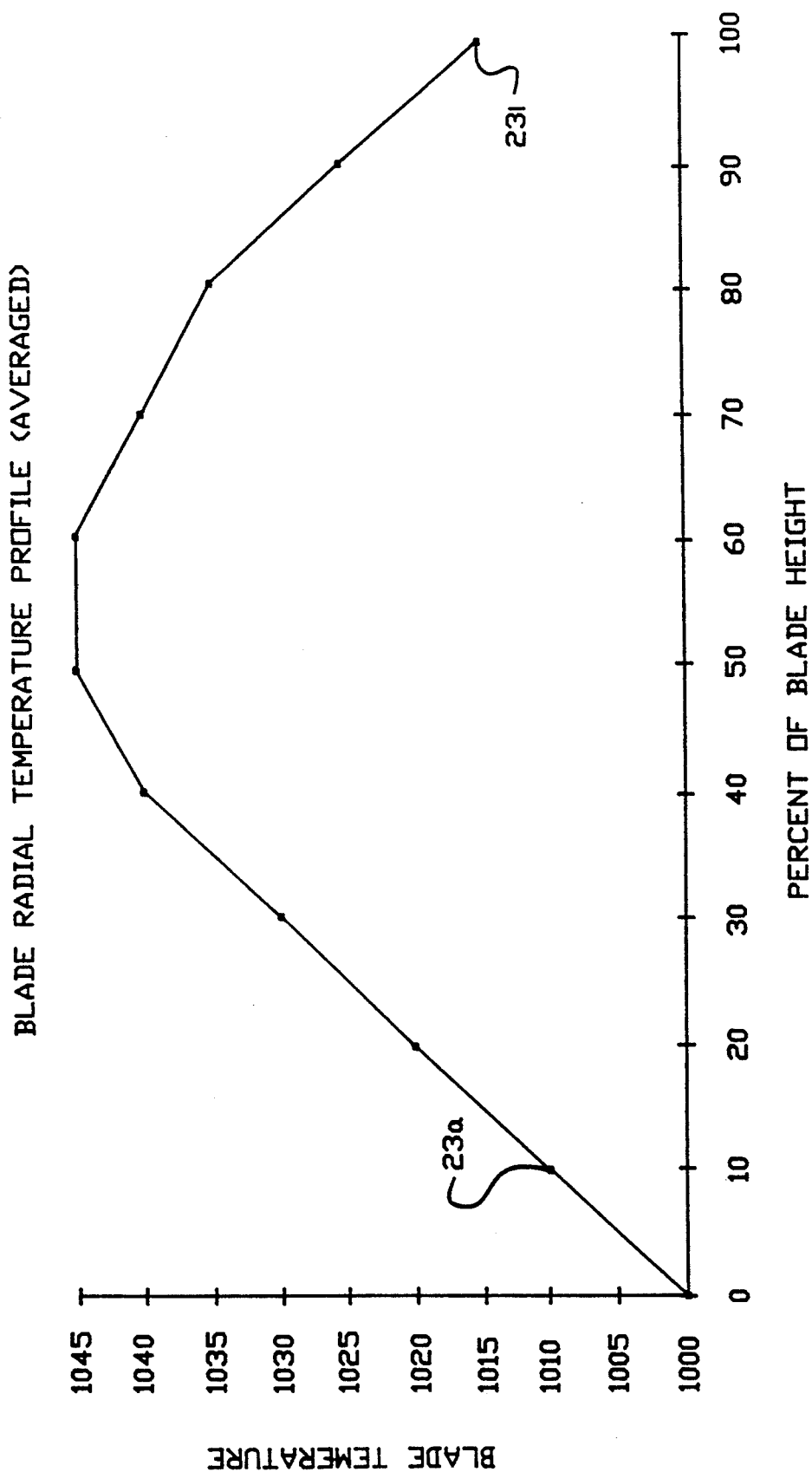
FIG. 5 is a characteristic curve useful in understanding the operation of the present invention.

Referring briefly to FIG. 5, this shows the various measurement points 23a–23i which are, of course, circumferentially averaged because of the rotation of the blades themselves. Zero % blade height is at the hub 21 and 100% at the tip. Typical temperatures are then given by the vertical axis in Fahrenheit degrees. A flow weighted average is taken by obtaining these temperatures at the several discrete locations, multiplying them by the flow passing through the corresponding increments of blade height, adding up the results and dividing by the total flow. For example, the flow weight average of the profile in the example of FIG. 5 would be about 1033° F. for a hub radius to tip radius ratio of 0.53.

Referring back to FIG. 2, the flow weight averaged temperature is computed as discussed above by the control unit 32, which receives the blade temperature profile on line 39 from combustion turbine 38. This is coupled to a comparison unit 33 which has the desired set point exhaust bulk gas flow total exhaust temperature 34 relative to the last stage. Amplifier 36 drives the fuel control unit 37 to adjust the amount of fuel which then controls the firing temperature of the gas turbine 38. The feedback temperature profile is shown on line 39.

The optical pyrometer 10 shown in FIG. 1 is shown in greater detail in FIG. 3; specifically the rotational axis 27 of the pyrometer is at an angle to its line of sight 18 to provide the radial scanning or traverse of the turbine blades illustrated in FIG. 1. Pyrometer 10 is rotatably connected to the fiber optic output line 41 which is attached to the optical insert 42 which is housed in the sighting tube 43. Bearing or split bushing 26 retains the holder unit 44 which rotates on the bearings. A cooling air inlet illustrated by the arrow 46 injects air to insure there is no back flow from the turbine exhaust vents into the chamber 47. It also cools the tip of the pyrometer. And it prevents the buildup of debris. A purge air tab at 48 prevents combustion gases from entering the sighting tube 43.

In operation an oscillatory device would be connected to the optical holder unit 44 (such unit being of well known construction). And the unit would be turned in increments or continuously with a feedback being given the control unit to determine the exact point on a turbine blade being sighted. Line of sight 18 rotates around the axis 27 with an effective traverse indicated by the angle 24. Thus the line of sight 18 effectively traverses the turbine blades of the last stage 11.

For redundancy, an additional pyrometer might be installed in another portion of the casing similar to FIG. 3.

Alternatively a series of stationary mounted pyrometers illustrated in FIG. 4, 50a through 50m, with different lines of sight 18' could be utilized. These stationary optical pyrometers could also be mounted externally of the turbine casing in standoff tubes. In this case, isolation valves can be installed in the tubes between the pyrometer and the flow path. When these valves are closed, the pyrometer may be removed for maintenance while the turbine is operating.

Alternative uses in addition to the feedback control of FIG. 2 would be using the technique to generally monitor gas temperature profile changes in the turbine blades. For example, if the profile changes such that the maximum temperature occurs closer to the hub where the stresses are higher, creep life could be substantially reduced. An algorithm to compute skewness of the profile could easily be built into the control system which would issue a warning that the profile has shifted to significantly affect life or in extreme cases shifted to such great extent that the machine should be shut down and corrective action taken. Control systems at the present time only monitor the circumferential spread in gas temperature from stationary thermocouple located at mid height in flow passages behind the last stage. This in combination with the radial profile monitoring provided by the pyrometer represents a substantial enhancement in rotor and stationary blade monitoring for life assessment purposes.

Thus the present invention provides for the measurement of bulk gas temperature with minimum uncertainty by measuring the metal temperature of the last row turbine blades and flow weight averaging the radial variations from hub to tip. This gives the best results for the following reasons. First the rotating blade acts as ideal circumferential averaging sensor (partially discussed above) because of its large thermal mass and high rotating speed only allow it to respond to the circumferential average gas temperature at a given radial location. Secondly because the last stage blades are uncooled, their metal temperature is essentially equal to the circumferential average total gas temperature relative to the blades; hence there is a much less uncertainty in the relationship between metal and gas temperatures than there would be for a cooled row of blades (for example, the first stage). Thirdly, the bulk temperature is obtained by the flow weight averaging. And since this is done at the last stage where the flow and flow distribution is well known, these quantities are very accurate. Specifically at the exit of the last stage rotor, all cooling and leakage flows which partially or fully bypass earlier stages have mixed back into the flow stream at this plane. Thus an optical pyrometer located at the last stage provides the most accurate measurement of gas bulk temperature. And in turn this permits optimal control of the turbine from the point of view of performance and blade life.

What is claimed is:

1. Apparatus for measuring rotor exhaust gas bulk total temperature in a combustion turbine which includes first and last stages of rotating turbine blades comprising:

optical pyrometer means for measuring the circumferentially total gas averaged temperature relative to said last stage turbine blades at a plurality of common radial points from the turbine hub to tip where said optical pyrometer means includes a single optical pyrometer having a line of sight along with means for rotating such pyrometer around an axis of rotation, with the pyrometer being tilted from said axis so that the line of sight of said pyrometer rotates around said axis thereby providing a radial traverse of said last stage turbine blades;

means for calculating said rotor exhaust bulk total temperature relative to said last stage blades by flow weight averaging said measured temperatures of said radial points.

2. Apparatus as in claim 1 including feedback control means using said calculated bulk temperature to control firing temperature of said combustion turbine.

* * * * *